Feb. 26, 1952 F. W. SIDE 2,587,236
VIBRATOR
Filed May 30, 1945
FIG. 1
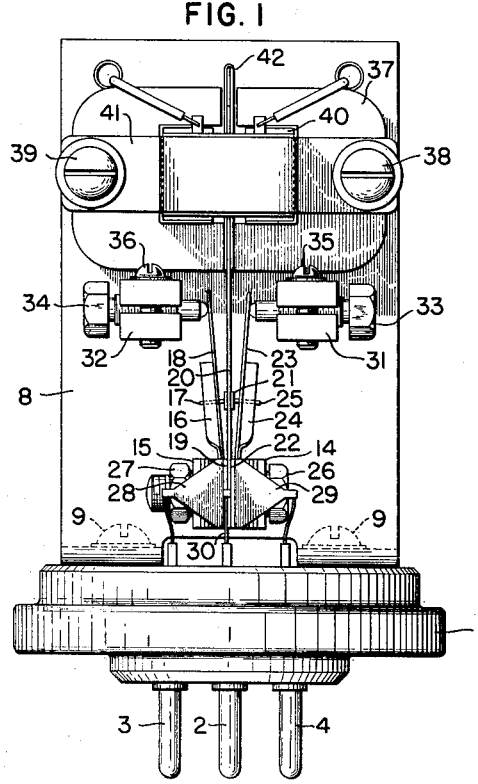
FIG. 2
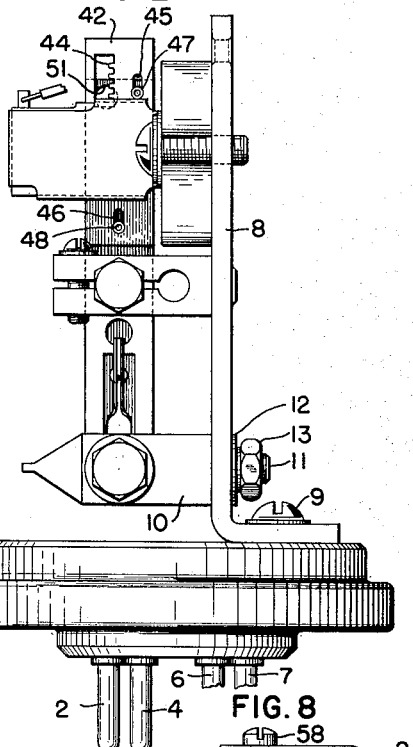
FIG. 5 FIG. 4 FIG. 3 FIG. 6
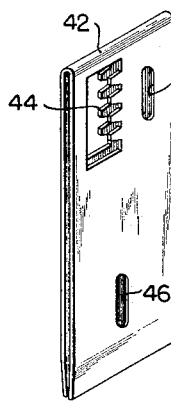 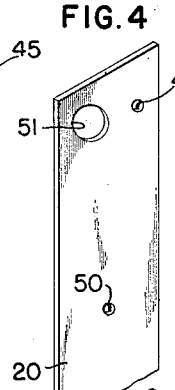 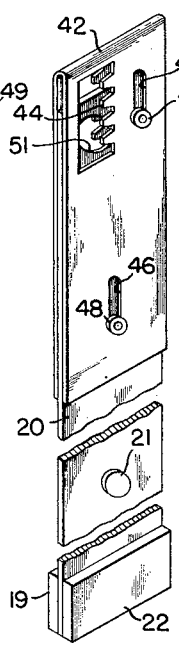 
FIG. 8
FIG. 7
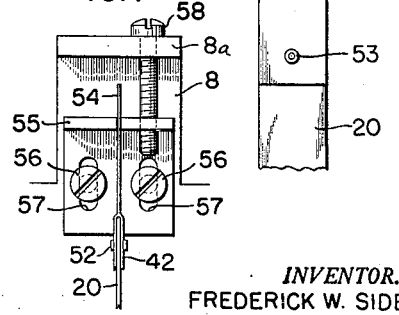
*INVENTOR.*
FREDERICK W. SIDE
BY
*C. B. Spangenberg*
ATTORNEY.

Patented Feb. 26, 1952

2,587,236

UNITED STATES PATENT OFFICE 2,587,236

VIBRATOR

Frederick W. Side, Philadelphia, Pa., assignor, by mesne assignments, to Minneapolis-Honeywell Regulator Company, Minneapolis, Minn., a corporation of Delaware Application May 30, 1945, Serial No. 596,753

21 Claims. (Cl. 200—90)

The present invention relates to improvements in electrical switching devices, and more especially, to electrical switching devices of the type disclosed in my prior application Serial Number 421,176, filed December 1, 1941, now Patent No. 2,423,524 of July 8, 1947, which effect the switching function at a rapid rate and to that end utilize a vibratile element. Thus, the invention has particular reference and application to electrical switching devices or vibrators having utility in electrical circuit arrangements, for example, as disclosed in the Wills application Serial Number 421,173, filed December 1, 1941, which issued as Patent No. 2,423,540 on July 8, 1947, for converting a small unidirectional electrical current into an alternating current which may be readily amplified for measurement and other purposes.

A general object of the invention is to provide in electrical switching devices having a vibratile element, readily adjustable and accessible means for varying the natural resonant frequency of that element.

Another object of the invention is to provide in such electrical switching devices readily adjustable means for universally adapting vibratile elements of the same dimensions and composition for satisfactory and efficient operation in electrical switching devices intended to effect the switching function at widely different frequencies.

In electrical switching devices or vibrators which utilize a vibratile element driven at a selected fundamental frequency, it is desirable from the standpoint of stability to so design the vibratile element that its natural resonant frequency is not the same as, nor a multiple or harmonic of, the said fundamental frequency. That is to say, if the natural resonant frequency of the vibratile element approximates or coincides with the fundamental of the frequency at which it is driven or vibrated, the power input to the vibratile element required to maintain it in vibration is so small that disturbances external of the switching device, such as shock and loading, are capable of seriously interfering with or even completely stopping the vibration of the vibratile element. On the other hand, when the fundamental and the harmonics of the natural resonant frequency of the vibratile element are substantially different from the frequency at which the vibratile element is actuated for vibration, considerably greater power is required to establish and maintain vibration at the driving frequency, resulting in a corresponding reduction in the effect of external disturbances upon the vibration of the vibratile element. By way of example, it is noted that the operation of such an electrical switching device driven at 60 cycles per second is substantially unaffected by external shock and loading effects when the natural resonant frequency of the vibratile element is made 85 cycles per second. The resonant frequency of 85 cycles per second of the vibratile element not only is substantially different from the fundamental or driving frequency of 60 cycles per second, but the resonant frequency and its harmonics also are substantially different from the harmonics of the driving frequency.

Difficulty is also encountered in the operation of such electrical switching devices or vibrators when a harmonic of the driving frequency approaches or coincides with the fundamental or a harmonic of the natural resonant frequency of the vibratile element. Such difficulty is manifested by the vibratile element vibrating at the said harmonic of the driving frequency as well as at the driving frequency, and consequently, in the electrical switching device effecting its switching function at both the fundamental and the harmonic of the driving frequency. For example, if the vibratile element is driven at a frequency of 25 cycles per second, and it has a natural resonant frequency of 75 cycles per second, the vibration of the vibratile element at 25 cycles per second will have superimposed upon it the vibration of 75 cycles per second, which is both the third harmonic of the fundamental driving frequency and the natural resonant frequency of the vibratile element. Similar difficulty is encountered when the vibratile element is driven at 40 cycles per second and its natural resonant frequency is 80 cycles per second. In such case, the vibration of the vibratile element at the driving frequency of 40 cycles per second will have superimposed upon it a vibration of 80 cycles per second which is both the second harmonic of the driving frequency and the natural resonant frequency of the vibratile element. The operation in each case is obviously undesirable since the switching function is effected in a manner not desired. This undesired operation results whenever the natural resonant frequency of the vibratile element is a harmonic or multiple of the frequency at which the vibratile element is driven.

Such undesired operation may be avoided by changing the frequency of the fundamental, and thereby the frequencies of the harmonics, of the natural resonant frequency of the vibratile element to values which are different from the fundamental and harmonic frequencies at which the vibratile element is driven. When the frequency-amplitude vibration characteristic of the vibratile element has a narrow, sharp peak, the magnitude of the frequency change in the natural resonant frequency of vibration of the vibratile element required to provide stable operation of the switching device at the desired frequency, and to prevent switching at a frequency other than the desired frequency, ordinarily is small, for example, of the order of a few cycles per second.

According to the present invention, readily adjustable and accessible means are associated with the vibratile element for adjusting its natural resonant frequency and the harmonics thereof as required to prevent the occurrence of vibration of said element at any frequency other than that at which it is driven, and consequently, to prevent the switching function from being accomplished at any frequency other than the desired frequency. It is an important feature of the invention, also, that the provision of means in association with the vibratile element for varying its natural resonant frequency of vibration renders the vibratile element universally adaptable for use in electrical switching devices intended to accomplish the switching function at widely different frequencies.

The natural resonant frequency of vibratile elements, intended to be of the same dimensions and composition, varies from element to element due to machining difficulties in maintaining close tolerances in dimensions, variations in the weight and distribution of the weight of the vibratile reeds utilized and also in the weight and distribution of the weight of iron armatures attached to the reeds, and variations in pressure exerted by secondary contacted members. The means provided in accordance with the present invention for readily adjusting the natural resonant frequency of vibration of the vibratile element make it possible to easily compensate for such variations, with the result that the natural resonant frequency of vibration of the element may be related in any desired manner to the frequency at which it is desired to accomplish the switching function.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a desirable embodiment of my invention.

Of the drawings:

Figs. 1 and 2 are front and side elevations, respectively, of one form of electrical switching device or vibrator in which the present invention may be utilized to advantage;

Fig. 3 is a detailed and enlarged view of the vibratile element utilized in the switching device of Figs. 1 and 2;

Fig. 4 is a detailed view of the vibratile reed of the vibratile element;

Fig. 5 is a detailed view of the iron armature which is associated with the free or vibrating end of the reed;

Fig. 6 illustrates a pinion tool which may be employed to operate the rack provided on the iron armature shown in Figs. 3 and 5; and Figs. 7 and 8 illustrate a modification of the vibratile element.

The electrical switching device or vibrator mechanism illustrated in Figs. 1 and 2 is of the general type shown and described in my aforementioned patent. The switching device is provided with a base 1 in which are mounted terminals 2, 3, 4, 5 (not shown), 6, and 7. Plate 8 is screwed to the base 1 by means of screws 9. A stud 10, provided with a screw threaded extension 11, is secured to the lower end of the plate 8 by means of a lock washer 12 and a nut 13. The free end of the stud 11 is bifurcated having spaced apart ends 14 and 15. Located between the spaced ends 14 and 15 are an insulating pad (not shown), a spring contact arm 16 carrying a contact 17, a resilient stop 18, an insulating pad 19, a vibratile reed 20 carrying contact 21, an insulating pad 22, a resilient stop 23, a spring contact arm 24 carrying a contact 25, and an insulating pad (not shown). These elements are all clamped between the spaced apart ends 14 and 15 by a bolt 26 and a nut 27. The spring contact arms 16 and 24 are respectively provided with ears 28 and 29 which are electrically connected to the terminals 3 and 4, respectively. The vibratile reed 20 is provided with an ear 30 which is electrically connected to the terminal 2. Riveted to the supporting plate 8 are also studs 31 and 32 which carry adjustable stops in the form of screws 33 and 34 formed of insulating material. When the adjustable stops 33 and 34 have been adjusted as desired, they are clamped in place by means of screws 35 and 36, respectively. The spring contact arm 24 carrying the contact 25 engages the resilient stop 23 because of its own resiliency, and the resilient stop 23, through its own resiliency, engages the adjustable stop 33. In like manner, the spring contact arm 16 engages the resilient stop 18 which, in turn, engages the adjustable stop 34. By adjusting the adjustable stops 33 and 34, the positions of the contacts 25 and 17 may be independently adjusted with respect to the contact 21 carried by the vibratile reed 20. A permanent magnet 37 is secured to the supporting plate 8 by means of screws 38 and 39. A coil 40 is held in place by a bracket 41 which, in turn, is secured in place by the screws 38 and 39. The end of the vibratile reed 20 is disposed within the coil 40 and is provided with an iron armature 42 which is mounted on the free end of the vibrating reed 20 by suitable eyelets 47 and 48, as seen in Fig. 2.

The coil 40 is designed to be energized with alternating current and when so energized acts on the armature 42 to vibrate the reed 20 at the frequency of the source of alternating current to cause the contact 21 to successively engage and disengage contacts 25 and 17 at the same frequency. The permanent magnet 37 operates in conjunction with the coil 40 and the armature 42 in such a manner as to cause the reed 20 to vibrate in synchronism with the alternating current supplied to the coil 40. By adjusting the adjustable stops 33 and 34, and thereby the contacts 25 and 17, the wave form produced by the contacts 17, 21 and 25 may be adjusted to the desired shape. The contacts 17 and 25 are preferably so arranged that when the contact 21 is in its stationary position it engages both contacts 25 and 17. This provides an overlapping action which compensates for wear of the contacts and also contributes to the elimination of stray electrical effects on the operation of the apparatus in which the switching device is utilized. Moreover, due to this overlapping action wear of the contacts does not materially alter the wave form produced by the contacts. By mounting the contacts 17 and 25 on the spring contact arms 16 and 24, respectively, good wiping contact is at all times provided between the contact 21 and the contacts 17 and 25.

If desired, an electrical connection may be provided between one of the screws 9 and ground potential so that the various parts of the switching device may be connected to ground to maintain the said switching device at ground potential. A cover (not shown) may also desirably be provided for enclosing the switching device. Such a cover may be held in place on the base 1 by means of a rolled flange clamping the cover to the base. Such a cover will act to prevent dirt and corrosive atmosphere from contaminating or otherwise affecting the parts of the switching device.

The switching device or vibrator described is essentially a polarized switching mechanism, the operating winding 40 and the permanent magnet 37 cooperating to vibrate the reed 20 at the same frequency as that of the alternating current utilized to energize the winding 40. For purposes of explanation, it may be assumed that the contact 25 is engaged by the contact 21 during the first half cycle of the energizing alternating current supply when the voltage is positive, and the second contact 17 is engaged by the contact 21 during the second half cycle when the alternating current supply is negative. Accordingly, the contacts 21 and 25 engage when the voltage of the alternating current supply is positive, and the contacts 21 and 17 engage when the voltage of the alternating current supply is negative. When the vibratile reed 20 is stationary in its mid position, both contacts 17 and 25 will be engaged by the contact 21 with the result that when the reed 20 is vibrated, the contact 21 is always in engagement with one or the other of the contacts 17 and 25.

In order to avoid complication of the drawing, the circuits in which the contacts 17, 21 and 25 may be connected have not been shown, but it will be understood that these contacts may be connected in any electrical circuit which it is desired to open and close at a desired frequency within the range of operation of the switching device. For example, as disclosed in my aforementioned patent and in the Wills patent previously mentioned, the contact 17 may be connected to one end terminal of the primary winding of a transformer and the contact 25 may be connected to the other end terminal of that primary winding. The contact 21 may be connected through a source of unidirectional voltage to a center tap on the transformer primary winding so that when the contact 21 alternately engages the contacts 17 and 25 an alternating voltage of one phase or of opposite phase, depending upon the polarity of the said unidirectional voltage, will be produced in a secondary winding provided on the transformer. The switching device, when so connected, thus serves the purpose of converting or translating a unidirectional current which otherwise may be difficult to measure or to amplify into an alternating current which may be readily amplified and utilized for measurement and control purposes.

In the practical application of electrical switching devices of the type shown in Figs. 1 and 2, difficulties are encountered when the reed 20 has a natural resonant frequency of vibration which approaches a multiple or harmonic of the fundamental frequency at which the reed is vibrated or driven by the cooperating action of the coil 40 and the iron armature 42. For example, if the reed has a natural resonant frequency of 80 cycles per second and the driving coil 40 is energized with alternating current having a frequency of 40 cycles per second, the reed will be vibrated at 40 cycles per second to move the contact 21 alternately into engagement with the contacts 17 and 25 at that frequency, but the reed 20 will also have superimposed upon it a vibration frequency of 80 cycles per second, its natural resonant frequency, which will cause the reed to alternately move the contact 21 into engagement with the contacts 17 and 25 at a frequency of 80 cycles per second. Consequently, the switching device will not operate according to its intended and desired manner.

In order to avoid such undesired operation and to permit universal use of the same reed or reeds of similar configuration and composition in electrical switching devices designed to accomplish the switching function at widely different frequencies, both legs of the iron armature 42 are provided with racks 44 arranged opposite each other and also with slits 45 and 46, as shown in Figs. 3, 4, and 5, to permit adjustment of the armature 42 outward or inward with reference to the fixed end of the reed. As shown, the armature 42 is attached to the reed 20 by means of eyelets 47 and 48 which are rigid with the reed 20 and extend through the slots 45 and 46, respectively, in the armature 42. The lower ends of the armature 42, as seen in Figs. 3 and 5, are bent or formed inwardly toward the reed 20 to insure that these ends exert pressure on the reed 20. Fig. 3 shows the complete vibratile element, while Fig. 4 shows only the reed 20 with the necessary holes 49 and 50 provided therein to accommodate the eyelets 47 and 48, respectively, and the hole 51 provided to guide the pinion tool shown in Fig. 6 and associated with the racks 44. Fig. 5 shows only the armature 42 with the necessary slots 45 and 46 formed therein, together with the racks 44. The pinion tool shown in Fig. 6 is provided with a pinion on the end thereof which, when inserted in hole 51 and rotated, engages the racks 44 and actuates the armature 42 upwardly or downwardly depending upon the direction of rotation.

The armature 42 may be urged outwardly or inwardly with respect to the reed 20 to thereby lengthen or shorten the length of the reed 20 by inserting in hole 51 the pinion tool shown in Fig. 6 and rotating it. It will be apparent that, if desired, a pinion may be permanently mounted in hole 51 and provided with a kerf for screw driver adjustment. When the armature 42 is moved toward the fixed end of the reed 20, the effective length of the reed is reduced, and consequently, the natural resonant frequency of the vibratile element is increased. This effect is further accentuated due to the displacement of the weight of the armature 42 toward the fixed end of the reed 20. When the armature 42 is moved away from the fixed end of the reed 20, the effective length of the reed is increased and in addition, the weight of the armature 42 is displaced away from the fixed end of the reed, whereby the natural resonant frequency of the vibratile element is decreased.

The adjustments just described provided in association with the electrical switching device or vibrator of Figs. 1 and 2, may also be utilized to advantage in those applications in which it may be desired to drive the vibratile element at its natural resonant frequency, as well as in applications where it is desired to drive the vibratile element at a frequency displaced from the natural resonant frequency. Due to variables encountered in the mass production or manufacture of vibratile reeds, such, for example, as slight variations in the thickness of the reed, variations in the weight of the iron armatures 42 attached to the reeds, and variations in the pressure exerted by the contacts 17 and 25 and the supporting members, the natural resonant frequency of reeds varies from reed to reed. According to the present invention such variations may be easily compensated for, merely by inserting the pinion tool in hole 51 and rotating it until the position of armature 42 has been properly related to reed 20.

In Figs. 7 and 8 I have illustrated, more or less diagrammatically, a modification of the vibratile element shown in Figs. 1–5 which provides the additional and important feature of permitting adjustments in the natural resonant frequency of vibration to be made while in vibration. In this modification the iron armature 42 is rigidly attached to the reed 20 by means of eyelets 52 and 53 or by other suitable means and the natural resonant frequency of vibration of the vibratile element is varied by adjusting the point along the length of a resilient spring member 54 at which the latter is engaged by a vertically movable angle member 55.

The resilient member 54 is fastened in any suitable manner to the end of armature 42, and as shown, comprises a longitudinal extension of the vibratile element. The vertical arm of angle member 55 is slidably attached by means of screws 56 to a vertical supporting member which desirably may comprise the supporting plate 8 of the switching device, as seen in Figs. 1 and 2, or a member supported thereby. Slots 57 are provided in association with the screws 56 to permit vertical movement of member 55. Such movement is accomplished by means of a screw 58 which is supported by an overhanging section 8a of plate 8 and threads into the horizontal arm of member 55. Thus, upon rotation of screw 58, member 55 is raised or lowered depending upon the direction of rotation. The horizontal arm of member 55 is provided with a slot of dimensions just sufficient to permit passage of the resilient member 54 and through which the member 54 extends, as shown. The engagement of member 54 by member 55 serves to load the vibratile element and thereby to control its natural resonant frequency of vibration.

By varying the point along the length of the member 54 at which it is engaged by member 55, as by rotation of screw 58, the natural resonant frequency of vibration of the vibratile element may be varied within a range of frequencies determined by the characteristics of the reed 20 and armature 42 and by the length and stiffness of resilient member 54. It will be apparent that this adjustment may be made while the vibratile element is in operation without significantly disturbing the vibration other than to change its frequency.

While, in accordance with the provisions of the statutes, I have illustrated and described the best form of embodiment of my invention now known to me, it will be apparent to those skilled in the art that changes may be made in the form of the apparatus disclosed herein without departing from the spirit of my invention, as set forth in the appended claims, and that in some cases certain features of my invention may be used to advantage without a corresponding use of other features.

Having now described my invention, what I claim as new and desire to secure by Letters Patent, is as follows:

1. An electrical switch device including in combination, a vibratile element comprising a vibratile reed supported at one end for vibration, a member lapped over the free end of said reed, and rotatable mechanical means in driving engagement with said member and operative, when rotated, to move said member toward or away from the supported end of said reed to vary the natural resonant frequency of vibration of said vibratile element, contact means carried by said reed, other contact means disposed in cooperative relation with said first mentioned contact means and arranged to be alternately engaged and disengaged thereby upon vibration of said vibratile element, and means to vibrate said vibratile element.

2. An electrical switching device including in combination a vibratile element comprising a vibratile reed supported at one end for vibration, a member movably mounted on the free end of said reed, and means including a rack and pinion to move said member toward or away from the supported end of said reed to vary the natural resonant frequency of vibration of said vibratile element, contact means carried by said reed, other contact means disposed in cooperative relation with said first mentioned contact means and arranged to be alternately engaged and disengaged thereby upon vibration of said vibratile element, and means to vibrate said vibratile element.

3. An electrical switching device including in combination a vibratile element comprising a vibratile reed supported at one end for vibration, a member movably mounted on the free end of said reed, and means including a rack and adapted to receive a pinion to operate said rack to move said member toward or away from the supported end of said reed to vary the natural resonant frequency of vibration of said vibratile element, contact means carried by said reed, other contact means disposed in cooperative relation with said first mentioned contact means and arranged to be alternately engaged and disengaged thereby upon vibration of said vibratile element, and means to vibrate said vibratile element.

4. An electrical switching device including in combination, a vibratile element comprising a vibratile reed adapted to be supported at one end for vibration, a member lapped over the free end of said reed and having its ends bent inwardly to insure the exertion of pressure by said member on said reed, said member having a rack and slots formed therein which extend in the direction of said reed away from the supported end, and eyelets carried by said reed and arranged in cooperative relation with said slots, said reed being provided with an opening adjacent said rack adapted to receive and support a pinion for actuating said rack to move said member outwardly or inwardly relatively to said reed with respect to the supported end, said eyelets serving to guide said member in such movement and to normally maintain said reed and member in fixed relation.

5. An electrical switching device including in combination, a vibratile element comprising a vibratile reed supported at one end for vibration, a resilient spring member attached to the free end of said reed and forming an extension thereof, an adjustable member physically engaging said spring member and supported independently thereof, rotatable mechanical means in driving engagement with said adjustable member and operative, when rotated, to move said adjustable member along the length of said spring member to vary the natural resonant frequency of vibration of said vibratile element, contact means carried by said reed, other contact means disposed in cooperative relation with said first mentioned contact means and arranged to be alternately engaged and disengaged thereby upon vibration of said vibratile element, and means to vibrate said vibratile element.

6. An electrical switching device including in combination, a vibratile element comprising a vibratile reed supported at one end for vibration, a member lapped over the free end of said reed, and rotatable mechanical means in driving engagement with said member and operative, when rotated, to move said member toward or away from the supported end of said reed to vary the natural resonant frequency of vibration of said vibratile element, a pair of relatively stationary contacts, contact means carried by said reed and arranged upon vibration of said reed to alternately engage and disengage first one and then the other of said pair of relatively stationary contacts, a pair of spring arms fixed at one end and each carrying one of said pair of relatively stationary contacts at the other end, said spring arms being biased to move said relatively stationary contacts towards said contact means and to permit movement of said relatively stationary contacts in the opposite direction upon engagement by said contact means, a pair of stops for limiting the movement of the spring arms and the relatively stationary contacts toward said contact means, and means to vibrate said vibratile element.

7. An electrical switching device including in combination, a vibratile element comprising a vibratile reed supported at one end for vibration, a member movably mounted on the free end of said reed, and means including a rack and adapted to receive a pinion to operate said rack to move said member toward or away from the supported end of said reed to vary the natural resonant frequency of vibration of said vibratile element, a relatively stationary contact, contact means carried by said reed and arranged upon vibration of said reed to alternately engage and disengage said relatively stationary contact, a spring arm fixed at one end and carrying said relatively stationary contact at its other end, said spring arm being biased to move said relatively stationary contact toward said contact means and to permit movement of said relatively stationary contact in the opposite direction upon engagement by said contact means, a stop for limiting the movement of the spring arm and said relatively stationary contact toward said contact means, and means to vibrate said vibratile element.

8. An electrical switching device including in combination, a vibratile element comprising a vibratile reed supported at one end for vibration, a resilient spring member attached to the free end of said reed and forming an extension thereof, an adjustable member physically engaging said spring member and supported independently thereof, rotatable mechanical means in driving engagement with said adjustable member and operative, when rotated, to move said adjustable member along the length of said spring member to vary the natural resonant frequency of vibration of said vibratile element, a pair of relatively stationary contacts, contact means carried by said reed and arranged upon vibration of said reed to alternately engage and disengage first one and then the other of said pair of relatively stationary contacts, a pair of spring arms fixed at one end and each carrying one of said pair of relatively stationary contacts at the other end, said spring arms being biased to move said relatively stationary contacts towards said contact means and to permit movement of said relatively stationary contacts in the opposite direction upon engagement by said contact means, a pair of stops for limiting the movement of the spring arms and the relatively stationary contacts toward said contact means, and means to vibrate said vibratile element.

9. An electrical switching device including in combination, a vibratile element comprising a vibratile reed supported at one end for vibration at any of a plurality of predetermined frequencies and means including a magnetic member associated with the free end of said reed to vary the natural resonant frequency of vibration of said vibratile element, operating means to vibrate said vibratile element at a selected one of said predetermined frequencies, means for adjusting said magnetic member to cause the natural resonant frequency of vibration of said reed to be substantially different from the fundamental and the harmonics of whichever one of said predetermined frequencies is the frequency at which said operating means vibrates said vibratile element, contact means carried by said reed, other contact means disposed in cooperative relation with said first mentioned contact means and arranged to be alternately engaged and disengaged thereby upon vibration of said vibratile element, said operating means to vibrate said vibratile element comprising a permanent magnet supported with its poles arranged adjacent said magnetic member, and a winding arranged to surround said magnetic member to alternately reverse its polarity.

10. An electrical switching device including in combination, a vibratile element comprising a vibratile reed supported at one end for vibration at any of a plurality of predetermined frequencies, a magnetic member lapped over the free end of said reed, operating means to vibrate said vibratile element at a selected one of said predetermined frequencies, means to move said member toward or away from the supported end of said reed to adjust the natural resonant frequency of vibration of said vibratile element to a value which is substantially different from the fundamental and the harmonics of whichever one of said predetermined frequencies is the frequency at which said operating means vibrates said vibratile element, contact means carried by said reed, other contact means disposed in cooperative relation with said first mentioned contact means and arranged to be alternately engaged and disengaged thereby when said vibratile element is in vibration, said operating means to vibrate said vibratile element comprising a permanent magnet supported with its poles arranged adjacent said magnetic member, and a winding arranged to surround said magnetic member to alternately reverse its polarity.

11. An electrical switching device including in combination, a vibratile element comprising a vibratile reed supported at one end for vibration, a magnetic member movably mounted of the free end of said reed, and means including a rack and adapted to receive a pinion to operate said rack to move said member toward or away from the supported end of said reed to vary the natural resonant frequency of vibration of said vibratile element, contact means carried by said reed, other contact means disposed in cooperative relation with said first mentioned contact means and arranged to be alternately engaged and disengaged thereby when said vibratile element is in vibration, and means to vibrate said vibratile element comprising a permanent magnet supported with its poles arranged adjacent said magnetic member, and a winding arranged to surround said magnetic member to alternately reverse its polarity.

12. A vibratile element comprising a vibratile reed adapted to be supported at one end for vibration, a member lapped over the free end of said reed, and rotatable mechanical means in driving engagement with said member and operative, when rotated, to move said member toward or away from the supported end of said reed to vary the natural resonant frequency of vibration of said vibratile element.

13. A vibratile element comprising a vibratile reed adapted to be supported at one end for vibration, a member movably mounted on the free end of said reed, and means including a rack and adapted to receive a pinion to operate said rack to move said member toward or away from the supported end of said reed to vary the natural resonant frequency of vibration of said vibratile element.

14. A vibratile element comprising a vibratile reed adapted to be supported at one end for vibration, a resilient spring member attached to the free end of said reed and forming an extension thereof, an adjustable member physically engaging said spring member and supported independently thereof, and rotatable mechanical means in driving engagement with said adjustable member and operative, when rotated, to move said adjustable member along the length of said spring member to vary the natural resonant frequency of vibration of said vibratile element.

15. A vibratile element comprising a vibratile reed adapted to be supported at one end for vibration, a movable member carried by the free end of said reed, said member having a rack and slots formed therein which extend in the direction of said reed away from the supported end, eyelets carried by said reed and arranged in cooperative relation with said slots, said reed being provided with an opening adjacent said rack adapted to receive and support a pinion for actuating said rack to move said member outwardly or inwardly relatively to said reed with respect to the supported end, said eyelets serving to guide said member in such movement and to normally maintain said reed and member in fixed relation.

16. A vibratile element comprising a vibratile reed adapted to be supported at one end for vibration, a member lapped over the free end of said reed and having its ends bent inwardly to insure the exertion of pressure by said member on said reed, said member having a rack and slots formed therein which extend in the direction of said reed away from the supported end, eyelets carried by said reed and arranged in cooperative relation with said slots, said reed being provided with an opening adjacent said rack adapted to receive and support a pinion for actuating said rack to move said member outwardly or inwardly relatively to said reed with respect to the supported end, said eyelets serving to guide said member in such movement and to normally maintain said reed and member in fixed relation.

17. An electrical switching device including in combination, a vibratile element comprising a vibratile reed supported at one end for vibration at any of a plurality of predetermined frequencies, means to vibrate said vibratile element at a selected one of said predetermined frequencies, a member movable with respect to the free end of said reed and operative to adjust the natural resonant frequency of vibration of said reed, rotatable mechanical means in driving engagement with said member and operative, when rotated, to move said member to a position in which the natural resonant frequency of vibration of said reed is substantially different from the fundamental and the harmonics of whichever one of said predetermined frequencies is the frequency at which said first mentioned means vibrates said vibratile reed, contact means carried by said reed, and other contact means disposed in cooperative relation with said first mentioned contact means and arranged to be alternately engaged and disengaged thereby upon vibration of said reed.

18. An electrical switching device including in combination, a vibratile element comprising a vibratile reed supported at one end for vibration at any of a plurality of predetermined frequencies, means to vibrate said vibratile element at a selected one of said predetermined frequencies, a member movable with respect to the free end of said reed and operative to adjust the natural resonant frequency of vibration of said reed, rotatable mechanical means in driving engagement with said member and operative, when rotated, to move said member to a position in which the natural resonant frequency of vibration of said reed is substantially different from the fundamental and the harmonics of whichever one of said predetermined frequencies is the frequency at which said first mentioned means vibrates said vibratile reed, a relatively stationary contact, contact means carried by said reed and arranged upon vibration of said reed to alternately engage and disengage said relatively stationary contact, a spring arm fixed at one end and carrying said relatively stationary contact at its other end, said spring arm being biased to move said relatively stationary contact toward said contact means and to permit movement of said relatively stationary contact in the opposite direction upon engagement by said contact means, and a stop for limiting the movement of the spring arm and said relatively stationary contact toward said contact means.

19. An electrical switching device including in combination, a vibratile element comprising a vibratile reed supported at one end for vibration at any of a plurality of predetermined frequencies, means to vibrate said vibratile element at a selected one of said predetermined frequencies, a member movable with respect to the free end of said reed and operative to adjust the natural resonant frequency of vibration of said reed, rotatable mechanical means in driving engagement with said member and operative, when rotated, to move said member to a position in which the natural resonant frequency of vibration of said reed is substantially different from the fundamental and the harmonics of whichever one of said predetermined frequencies is the frequency at which said first mentioned means vibrates said vibratile reed, a pair of relatively stationary contacts, contact means carried by said reed and arranged upon vibration of said reed to alternately engage and disengage first one and then the other of said pair of relatively stationary contacts, a pair of spring arms fixed at one end and each carrying one of said pair of relatively stationary contacts at the other end, said spring arms being biased to move said relatively stationary contacts towards said contact means and to permit movement of said relatively stationary contacts in the opposite direction upon engagement by said contact means, and a pair of stops for limiting the movement of the spring arms and the relatively stationary contacts toward said contact means.

20. An electrical switching device including in combination, a vibratile element comprising a vibratile reed supported at one end for vibration at any of a plurality of predetermined frequencies, means to vibrate said vibratile element at a selected one of said predetermined frequencies, a member movable with respect to the free end of said reed and operative to adjust the natural resonant frequency of vibration of said reed, rotatable mechanical means in driving engagement with said member and operative, when rotated, to move said member to a position in which the natural resonant frequency of vibration of said reed is substantially higher than the fundamental and substantially different from the harmonics of whichever one of said predetermined frequencies is the frequency at which said first mentioned means vibrates said vibratile reed, contact means carried by said reed, and other contact means disposed in cooperative relation with said first mentioned contact means and arranged to be alternately engaged and disengaged thereby upon vibration of said reed.

21. An electrical switching device including in combination, a vibratile element comprising a vibratile reed adapted to be supported at one end for vibration, a member lapped over the free end of said reed and having its ends bent inwardly to insure the exertion of pressure by said member on said reed, said member having a rack and slots formed therein which extend in the direction of said reed away from the supported end, and eyelets carried by said reed and arranged in cooperative relation with said slots, said reed being provided with an opening adjacent said rack adapted to receive and support a pinion for actuating said rack to move said member outwardly or inwardly relatively to said reed with respect to the supported end, said eyelets serving to guide said member in such movement and to normally maintain said reed and member in fixed relation, contact means carried by said reed, other contact means disposed in cooperative relation with said first mentioned contact means and arranged to be alternately engaged and disengaged thereby upon vibration of said vibratile element, and means to vibrate said vibratile element.

FREDERICK W. SIDE.

REFERENCES CITED

The following references are of record in the file of this patent:

UNITED STATES PATENTS

| Number | Name | Date |
|---|---|---|
| 345,209 | Brown | July 6, 1886 |
| 524,165 | Downes | Aug. 7, 1894 |
| 560,056 | Arnold | May 12, 1896 |
| 614,794 | Crawford | Nov. 22, 1898 |
| 653,936 | Murray | July 17, 1900 |
| 731,056 | Jones | June 16, 1903 |
| 1,535,088 | Barnhart | Apr. 28, 1925 |
| 1,676,979 | Cheeseman | July 10, 1928 |
| 1,919,041 | Roe | July 18, 1933 |
| 2,050,665 | Matthews et al. | Aug. 11, 1936 |
| 2,106,922 | Tascher | Feb. 1, 1938 |
| 2,131,789 | Sullivan et al. | Oct. 4, 1938 |
| 2,163,195 | Edwards | June 20, 1939 |
| 2,197,607 | Brown | Apr. 16, 1940 |
| 2,200,064 | James | May 7, 1940 |
| 2,253,602 | Barrett | Aug. 26, 1941 |
| 2,366,618 | Harrison | Jan. 2, 1945 |
| 2,394,763 | Grant | Feb. 12, 1946 |
| 2,423,524 | Side | July 8, 1947 |

FOREIGN PATENTS

| Number | Country | Date |
|---|---|---|
| 475,577 | Great Britain | Nov. 18, 1937 |